United States Patent
Hsueh

(10) Patent No.: US 9,092,065 B2
(45) Date of Patent: Jul. 28, 2015

(54) INPUT DEVICE AND LIFTING STRUCTURE FOR THE INPUT DEVICE

(71) Applicant: ELAN MICROELECTRONICS CORPORATION, Hsin Chu (TW)

(72) Inventor: Lu-Yuan Hsueh, New Taipei (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 32 days.

(21) Appl. No.: 14/092,986

(22) Filed: Nov. 28, 2013

(65) Prior Publication Data

US 2015/0009156 A1 Jan. 8, 2015

(30) Foreign Application Priority Data

Jul. 2, 2013 (TW) .............................. 102123615 A

(51) Int. Cl.
*G06F 3/02* (2006.01)
*G06F 3/041* (2006.01)
*G06F 3/12* (2006.01)
*G06F 1/16* (2006.01)
*H01H 3/12* (2006.01)

(52) U.S. Cl.
CPC .............. *G06F 3/0202* (2013.01); *G06F 1/169* (2013.01); *G06F 3/0414* (2013.01); *H01H 3/125* (2013.01); *H01H 2221/058* (2013.01)

(58) Field of Classification Search
CPC ....... G06F 1/169; G06F 3/033; G06F 3/0354; G06F 3/03547; G06F 3/0202; G06F 3/0414; H01H 3/125; H01H 2221/058
USPC .................... 200/341, 345; 361/679.1, 679.18
See application file for complete search history.

(56) References Cited

U.S. PATENT DOCUMENTS

| | | | |
|---|---|---|---|
| 6,534,736 B1 * | 3/2003 | Lee et al. ................ 200/344 |
| 6,733,196 B2 * | 5/2004 | Lee et al. ................ 400/480 |
| 8,030,585 B2 * | 10/2011 | Wang .................... 200/344 |
| 8,144,453 B2 * | 3/2012 | Brown et al. ........... 361/679.21 |
| 8,780,543 B2 * | 7/2014 | Molne et al. .......... 361/679.21 |
| 8,829,378 B2 * | 9/2014 | Villain ................ 200/512 |
| 8,860,671 B2 * | 10/2014 | Jung et al. ............ 345/173 |
| 2003/0047435 A1 * | 3/2003 | Lee et al. .............. 200/344 |
| 2009/0038922 A1 * | 2/2009 | Wang .................... 200/344 |
| 2010/0025213 A1 * | 2/2010 | Li ....................... 200/344 |
| 2010/0103640 A1 * | 4/2010 | Brown et al. ............ 361/829 |
| 2010/0127140 A1 * | 5/2010 | Smith .................. 248/220.1 |
| 2010/0302153 A1 * | 12/2010 | Jung et al. .............. 345/158 |
| 2012/0103773 A1 * | 5/2012 | Villain ................ 200/344 |
| 2012/0200789 A1 * | 8/2012 | Molne et al. ............ 349/12 |
| 2013/0155017 A1 * | 6/2013 | Rehn et al. ............. 345/174 |
| 2014/0318942 A1 * | 10/2014 | Takemae et al. ......... 200/5 A |

(Continued)

*Primary Examiner* — Patrick F Marinelli
(74) *Attorney, Agent, or Firm* — patenttm.us

(57) ABSTRACT

An input device has a base, two shafts, a touchpad and a switch. The shafts are pivotally connected between the base and the touchpad, and intersect each other. When the touchpad is pressed, the shafts rotate relative to the base and the touchpad simultaneously. As the shafts intersect each other, an intersection of the shafts is nearby or exactly on a center of the touchpad, such that the shafts can pull down the touchpad from the center. Thus, no matter what location on the touchpad is pressed, a pressing force is spread uniformly, which makes the touchpad move down evenly without tilting. Besides, pulling down the touchpad from the center can further prevent leverage and deformation of the touchpad, thereby avoiding affecting the user's feel of pressing. To sum up, the input device can make the touchpad move down evenly, and prevent the touchpad from deformation.

18 Claims, 14 Drawing Sheets

(56) References Cited

U.S. PATENT DOCUMENTS

| | | | |
|---|---|---|---|
| 2014/0339064 A1* | 11/2014 | Chang et al. | 200/5 A |
| 2014/0367240 A1* | 12/2014 | Lin et al. | 200/5 A |
| 2015/0042565 A1* | 2/2015 | Mizutani et al. | 345/161 |
| 2015/0047959 A1* | 2/2015 | Wu et al. | 200/344 |

* cited by examiner

INPUT DEVICE AND LIFTING STRUCTURE FOR THE INPUT DEVICE

CROSS-REFERENCE TO RELATED APPLICATIONS

This application is based upon and claims priority under 35 U.S.C. 119 from Taiwan Patent Application No. 102123615 filed on Jul. 2, 2013, which is hereby specifically incorporated herein by this reference thereto.

BACKGROUND OF THE INVENTION

1. Field of the Invention

The present invention relates to a lifting structure for an input device, especially to a lifting structure for a touchpad.

2. Description of the Prior Arts

Touchpad is a common input device in electronic devices nowadays, and is especially common in portable electronic devices, such as laptop. The touchpad can replace a mouse and enable a user to control the portable electronic device to move a cursor on a screen without using the mouse.

The conventional touchpad has to be operated with two keys. The keys are disposed underneath the touchpad, and the two keys each respectively correspond in function to a left button and a right button of the mouse. For operating the touchpad and the keys, the user moves the cursor on the touchpad and clicks on the keys.

However, the touchpad nowadays can do without the keys and is pressable. The touchpad has to be operated with a switch disposed beneath the touchpad. When the touchpad is pressed down, the touchpad abuts and actuates the switch. Meanwhile, the touchpad detects that the user presses a right part or a left part of the touchpad, so as to identify whether the user intends to achieve the function of clicking the left button or the right button.

With reference to FIGS. 14 and 15, the user may press on any location on the touchpad 91, but the touchpad 91 should always be moved down evenly without tilting. Thus, there is a scissor mechanism mounted between the touchpad 91 and a base 92 disposed beneath the touchpad 91. The scissor mechanism has two frames 93. Each frame 93 is looped into a rectangle, and has a bottom segment 931, a side segment 932 and a top segment 933 connected to one another in sequence. The touchpad 91 has multiple hooks 911, 912 formed on a bottom of the touchpad 91. The base 92 has multiple hooks 921, 922 formed on a top of the base 92. Of one of the frames 93, the bottom segment 931 is pivotally connected to the hook 921 in right side of the base 92, and the top segment 933 is pivotally and slidably connected to the hook 912 in left side of the touchpad 91. In the other frame 93, the bottom segment 931 is pivotally and slidably connected to the hook 922 in left side of the base 92, and the top segment 933 is pivotally connected to the hook 911 in right side of the touchpad 91. The side segments 932 of the two frames 93 are pivotally connected to each other, and intersect each other to form an X shape.

The touch pad 91 may be touched on any location thereon, and the top segment 931 and the bottom segment 932 of the frame 93 nearer to the pressing point each respectively rotate relative to the touchpad 91 and the base 92. At the same time, the frame 93 moves the other frame 93 by the side segments 932 to move up and down simultaneously, thereby making the touchpad 91 move up and down evenly without tilting.

With reference to FIG. 16, the switch 94 corresponds to a center of the touchpad 91, such that a pressing force, which may be applied on any location of the touchpad 91, can transmit to the switch 94 effectively. However, when the pressing point is adjacent to a side of the touchpad 91, the touchpad 91 is pulled down by the top segments 933 in two opposite sides. Thus, the switch 94 in the center may function as a pivot to create leverage, thereby making the touchpad 91 deform and the two opposite sides of the touchpad 91 slightly bend downward. The deformation absorbs part of the pressing force, thereby reducing a moving distance of the touchpad 91. The pressing force must be increased to abut and actuate the switch 94. Besides, the touchpad 91 may deform and be bent, such that the user's feel of pressing is less smooth.

To overcome the shortcomings, the present invention provides an input device and lifting structure for the input device to mitigate or obviate the aforementioned problems.

SUMMARY OF THE INVENTION

The main objective of the present invention is to provide an input device and lifting structure for the input device that makes a touchpad move down evenly without tilting and prevents the touchpad from deformation.

The input device has a base, two shafts, a touchpad and a switch. The shafts are pivotally connected between the base and the touchpad, and intersect each other. When the touchpad is pressed, the shafts rotate relative to the base and the touchpad simultaneously. As the shafts intersect each other, an intersection of the shafts is nearby or exactly on a center of the touchpad, such that the shafts can pull down the touchpad from the center. Thus, no matter what location on the touchpad is pressed, a pressing force is spread uniformly, which makes the touchpad move down evenly without tilting. Besides, pulling down the touchpad from the center can further prevent leverage as well as the deformation of the touchpad that affects the user's feel of pressing. To sum up, the present invention can make the touchpad move down evenly, and prevent the touchpad from deformation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
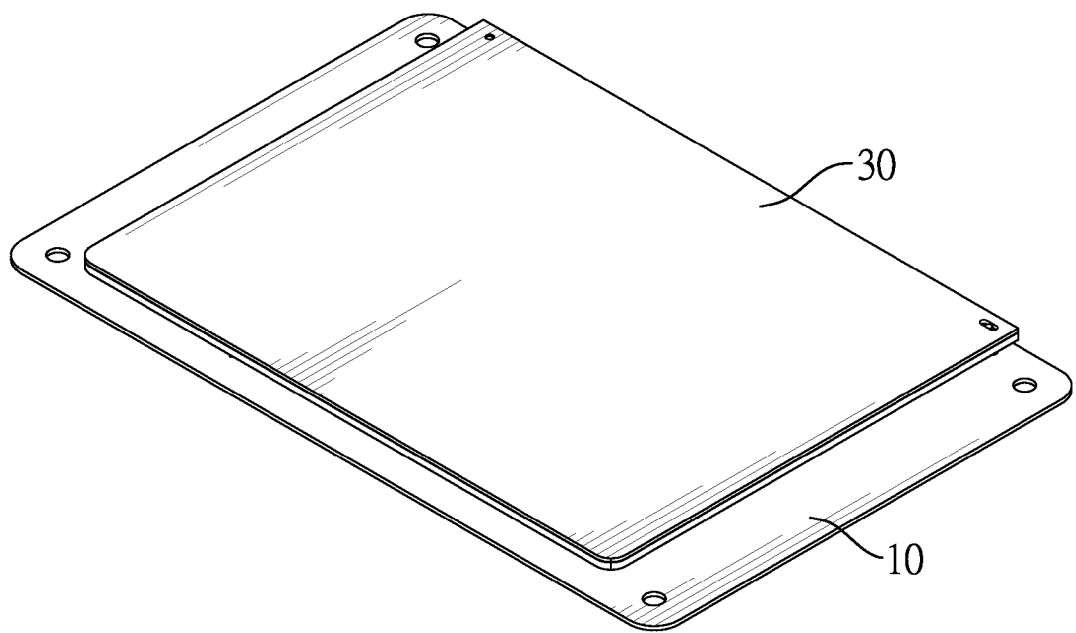
FIG. 1 is a perspective view of a first embodiment of an input device in accordance with the present invention.
Figure 2:
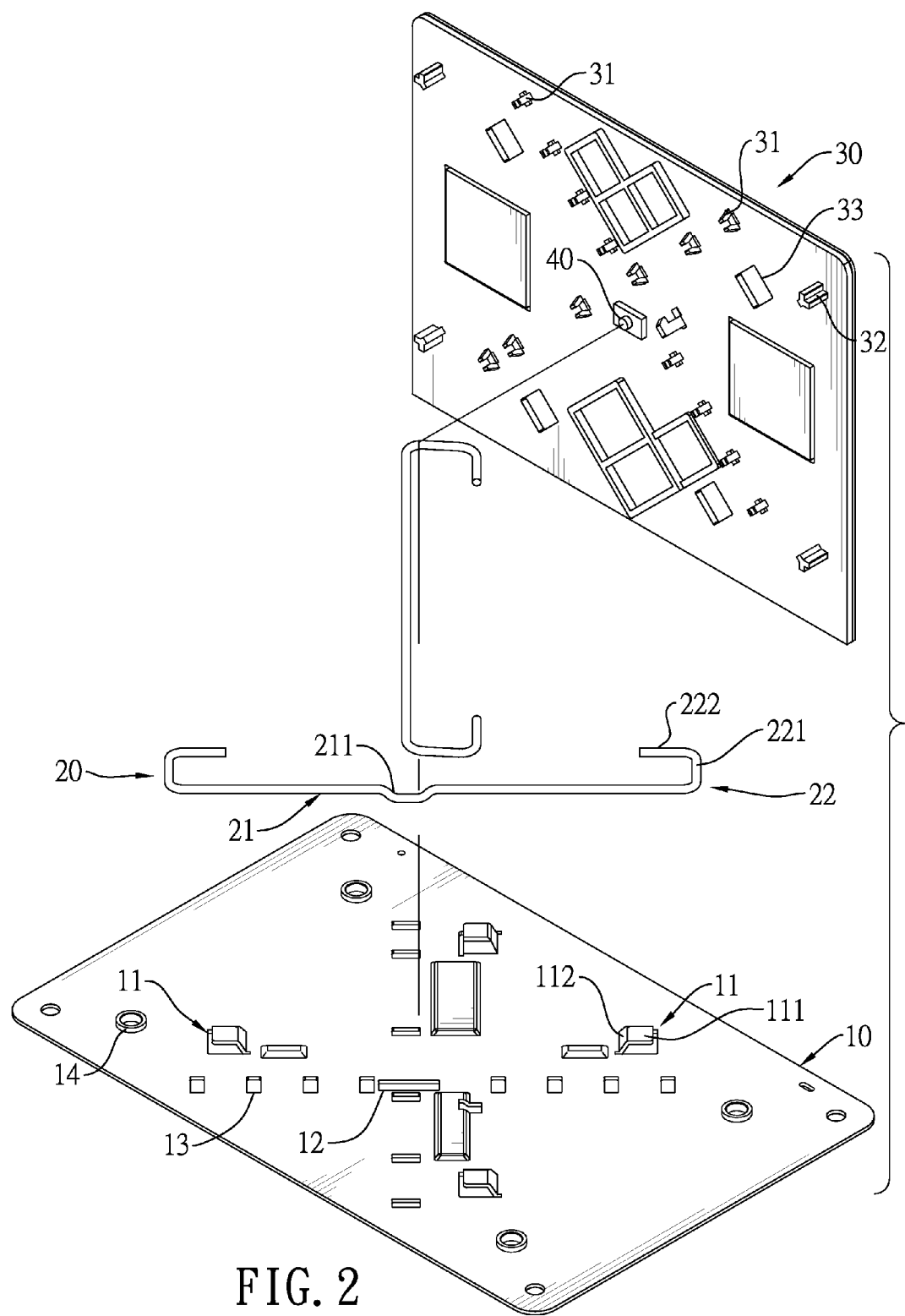
FIG. 2 is an exploded perspective view of the input device in FIG. 1.

With reference to FIGS. 1 and 2, a first embodiment of an input device in accordance with the present invention comprises a base 10, two shafts 20, a touchpad 30 and a switch 40.

Figure 3:
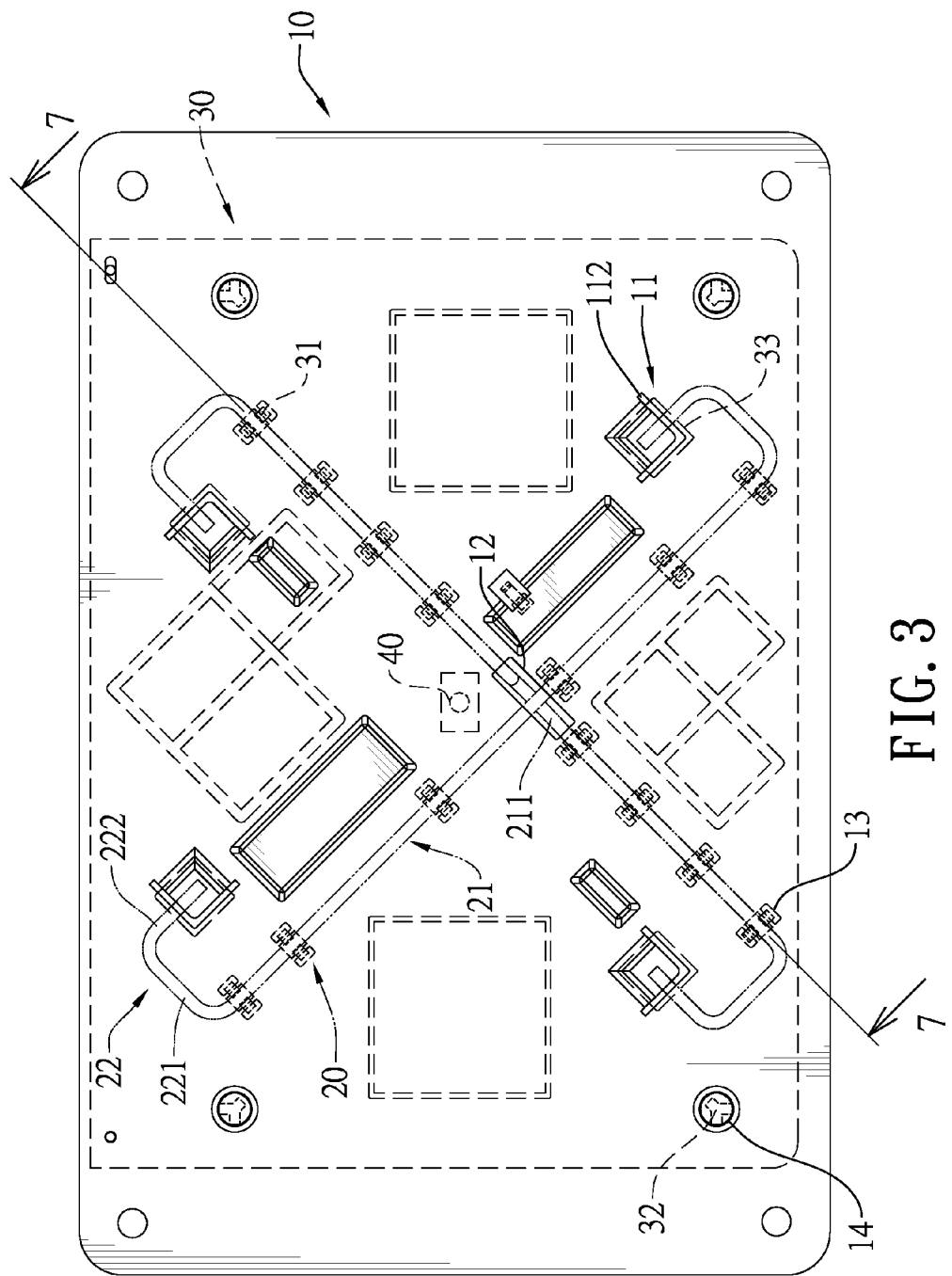
FIG. 3 is a top view of the input device in FIG. 1, showing two shafts.
Figure 4:
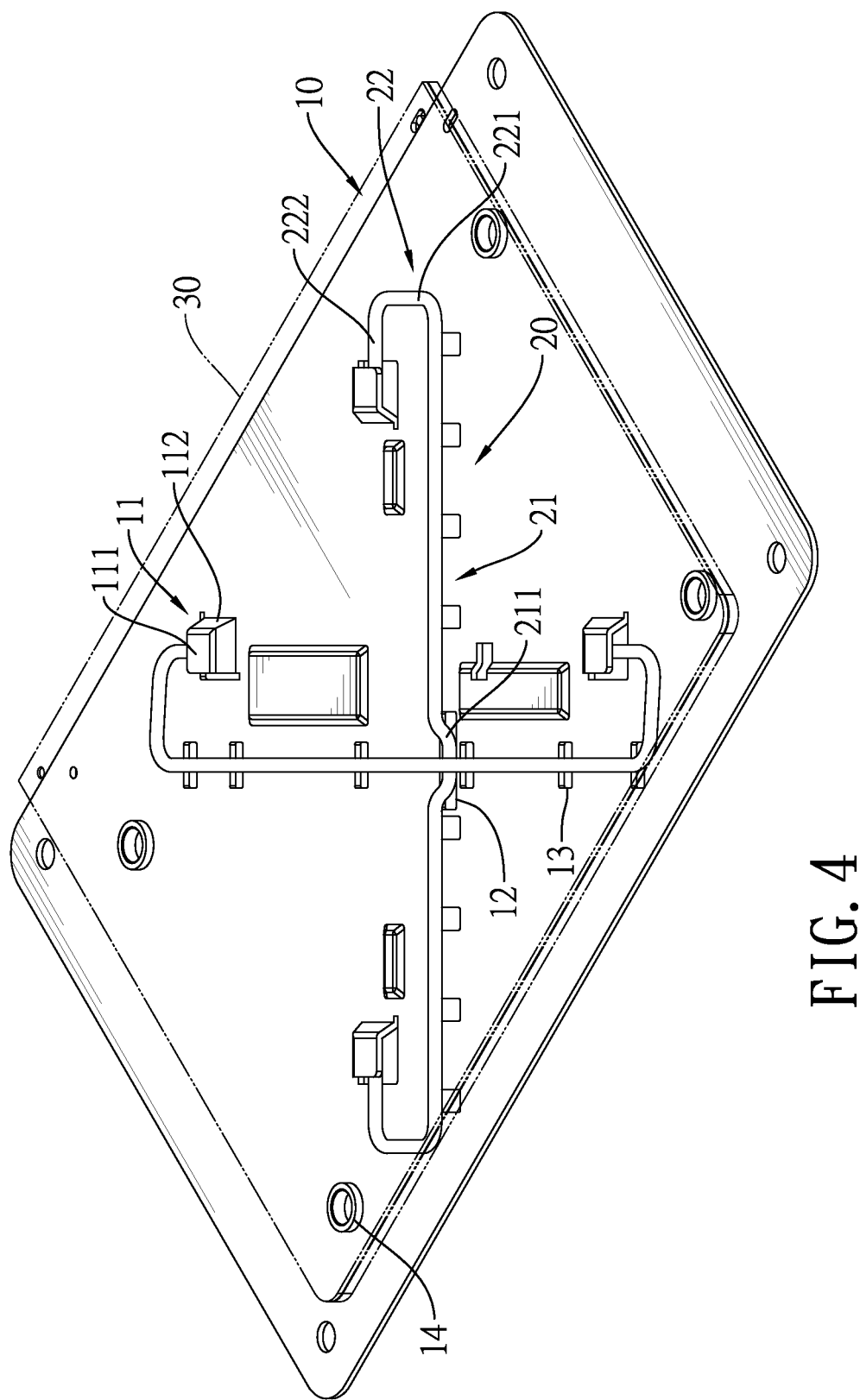
FIG. 4 is a perspective view of the input device in FIG. 1, showing the shafts mounted on a base.

With reference to FIGS. 2 to 4, the base 10 is rectangular, and has multiple limits 11 mounted on a top of the base 10. In a preferred embodiment, the base 10 has four limits 11, which correspond to a number of ends of the two shafts 20. The limits 11 are substantially arranged in a rectangle. Each limit 11 has a top part 111, two side parts 112, an inner space and an opening. Each side part 112 is connected to the top part 111 of the limit 11 and the top of the base 10. The inner space and the opening are surrounded by the top of the base 10, the side parts 112 and the top part 111. The opening communicates with the inner space. The base 10 has a bending recess 12, multiple pivot recesses 13 and multiple positioning holes 14. The bending recess 12 is formed in the top of the base 10, is elongated, and is adjacent to a center of the base 10. The pivot recesses 13 are formed in the top of the base 10, and are arranged in two intersecting lines. The positioning holes 14 are formed in the top of the base 10. In a preferred embodiment, the base 10 has four positioning holes 14, and the positioning holes 14 are each respectively disposed in four corners of the base 10.

Figure 9:
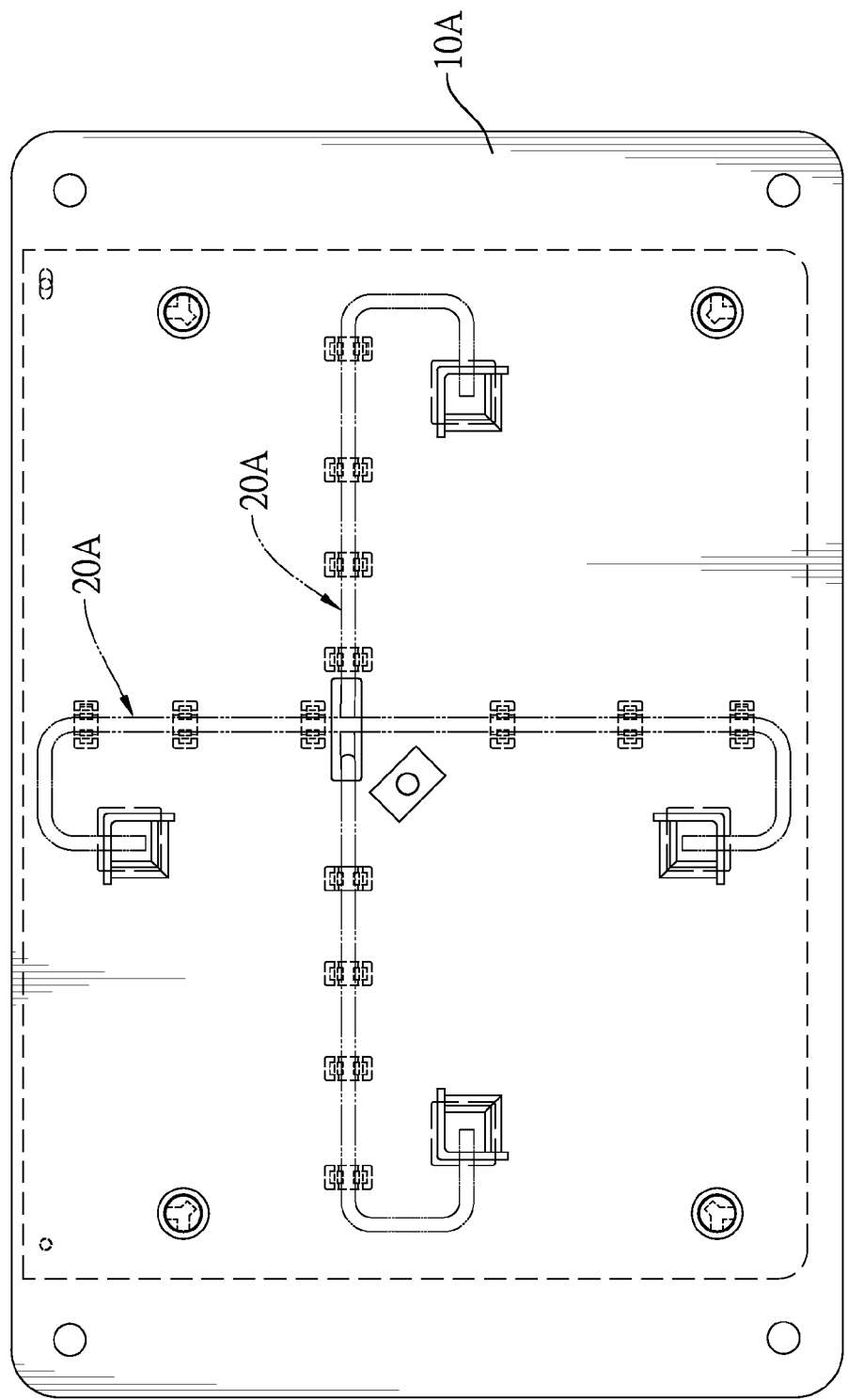
FIG. 9 is a top view of another embodiment of the input device in accordance with the present invention, showing the shafts.

The shafts 20 are mounted on the base 10, intersect each other, and form a supporting surface. In a preferred embodiment, each shaft 20 is nonparallel to any side of the base 10. Preferably each shaft 20 is at an angle of 45 degrees relative to a corresponding side of the base, and the shafts 20 are arranged in an X shape. With reference to FIG. 9, in another referred embodiment, each shaft 20A is parallel to a corresponding side of the base 10A, and the shafts 20A are arranged in a cross shape. With reference to FIGS. 2 to 4, in a preferred embodiment, two ends of each shaft 20 are each respectively and slidably mounted in the limits 11 in two diagonally opposite corners of the base 10. Each shaft 20 has a rod part 21 and two connecting ends 22. The connecting ends 22 are each respectively bent from two ends of the rod part 21, and each connecting end 22 has a connecting segment 221 and an inserting segment 222. The connecting segment 221 is bent from the rod part 21. The inserting segment 222 is bent from the connecting segment 221, is mounted through the opening of the corresponding limit 11, is slidably mounted into the inner space of the corresponding limit 11, and is rotatable relative to the corresponding limit 11. The connecting ends 22 of each shaft 20 are each respectively limited in the limits 11, such that the rod part 21 can remain parallel with the base 10 when the shaft 20 moves up and down. One of the shafts 20 has a bending segment 211. The bending segment 211 is bent in the rod part 21, and is curved to allow the rod part 21 of the other shaft 20 to pass through an intersection of the shafts 20, such that the shafts 20 can intersect each other in a manner that the rod parts 21 of the shafts 20 are flush with a bottom of the touchpad 30. The bending recess 12 of the base 10 is disposed in a position corresponding to a position of the bending segment 211. Thus, when the touchpad 30 is pulled down by the shafts 20, the bending recess 12 can receive the bending segment 211 of the shaft 20, which is nearby the top of the base 10, to avoid an interference between the bending segment 211 and the base 10.

Figure 5:
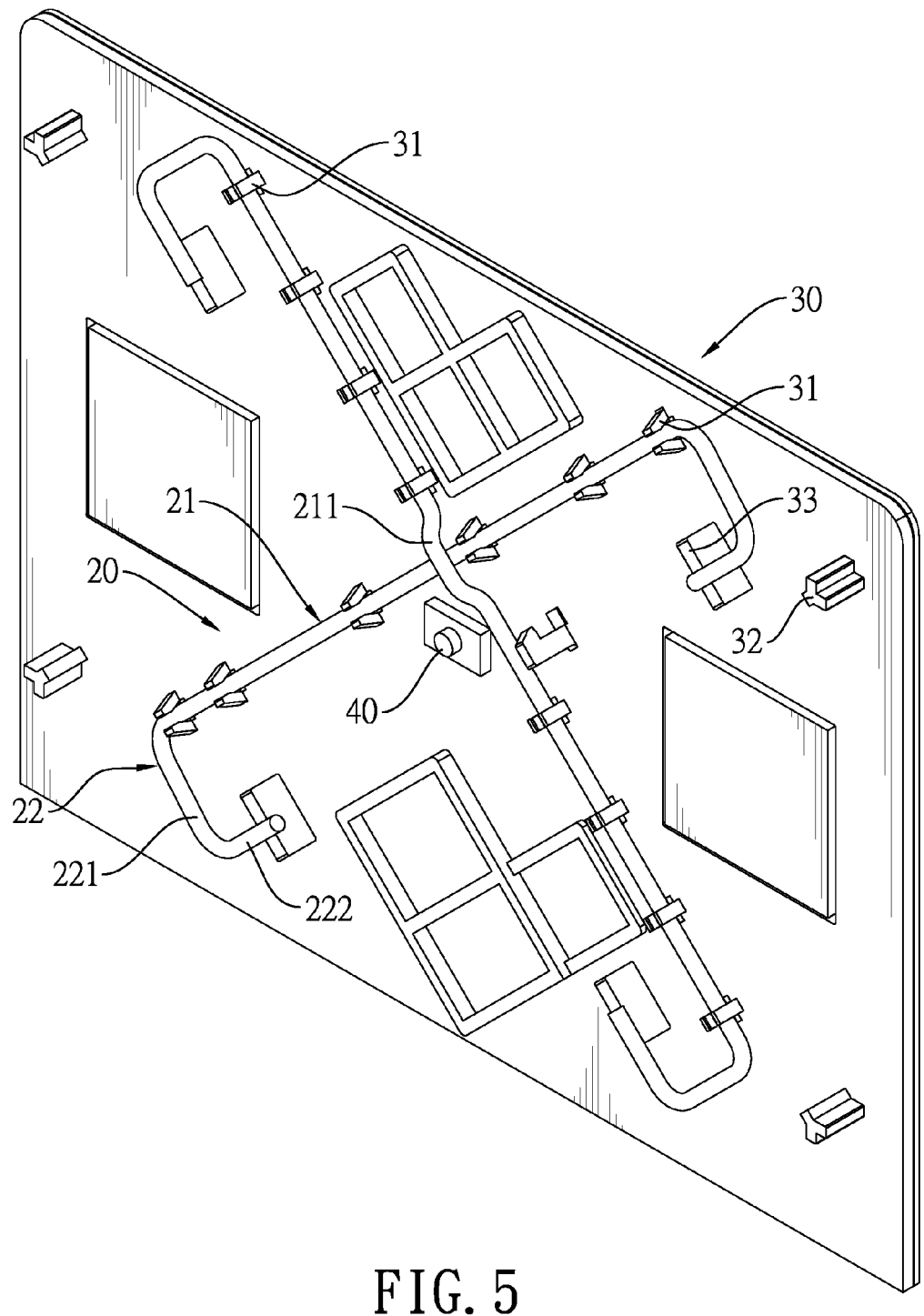
FIG. 5 is a perspective view of the input device in FIG. 1, showing the shafts mounted on a touchpad.

With reference to FIGS. 2, 3 and 5, the touchpad 30 is mounted on the supporting surface defined by the shafts 20, and is pivotally connected to the shafts 20. The touchpad 30 is rectangular. In a preferred embodiment, the ends of each shaft 20 each respectively protrude to two diagonally opposite corners of the touchpad 30. The touchpad 30 has multiple pivot segments 31 formed on the bottom of the touchpad 30, and the multiple pivot segments 31 are arranged in two intersecting lines. The shafts 20 each respectively and rotatably engage in the interesting lines of the pivot segments 31. When the touchpad 30 is pressed down, the pivot recesses 13 of the base 10 can respectively receive the pivot segments 31 to avoid an interference between the pivot segments 31 and the base 10. The touchpad 30 has four positioning pins 32 formed on the bottom of the touchpad 30, each respectively disposed in the four corners of the touchpad 30, and each respectively and movably mounted in the four positioning holes 14 of the base 10 to prevent the touchpad 30 from horizontally moving relative to the base 10. The touchpad 30 has four limit recesses 33 formed in the bottom of the touchpad 30. The limit recesses 33 are disposed in a position corresponding to a position of the limits 11 of the base 10. Thus, when the touchpad 30 is pressed down, the limit recesses 33 can respectively receive the limits 11 to avoid an interference between the limits 11 and the touchpad 30.

Figure 7:
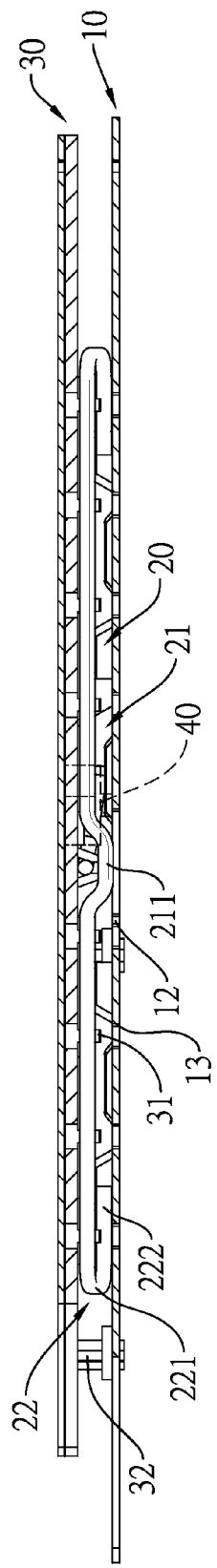
FIG. 7 is a side view in partial section of the input device in FIG. 1, showing the touchpad unpressed.
Figure 10:
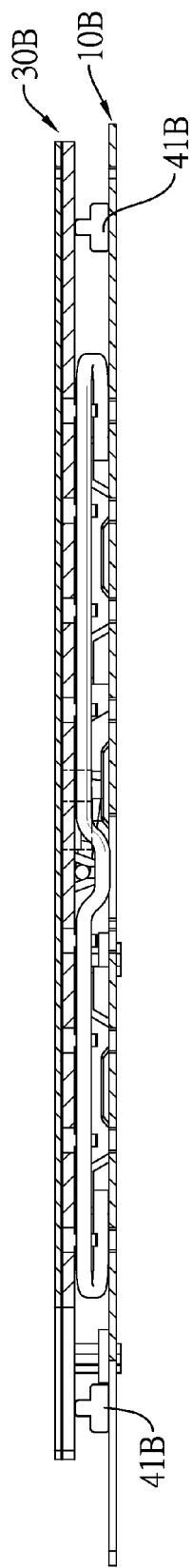
FIG. 10 is a side view in partial section of still another embodiment of the input device in accordance with the present invention, showing resilient elements.

The switch 40 is mounted between the base 10 and the touchpad 30. In a preferred embodiment, the switch 40 is mounted on a center of the bottom of the touchpad 30, and abuts the top of the base 10 as shown in FIG. 7. In another embodiment, the switch 40 also can be mounted in other locations on the bottom of the touchpad 30, a center of the top of the base 10, or other locations on the top of the base 10. In a preferred embodiment, the switch 40 is a resilient switch and abuts the base 10 and the touchpad 30 to allow the touchpad 30 to move up and down relative to the base 10. In another embodiment as shown in FIG. 10, the input device further comprises at least one resilient element 41B mounted between the base 10B and the touchpad 30B, and abutting the base 10B and the touchpad 30B to allow the touchpad 30B to move up and down relative to the base 10B.

Figure 6:
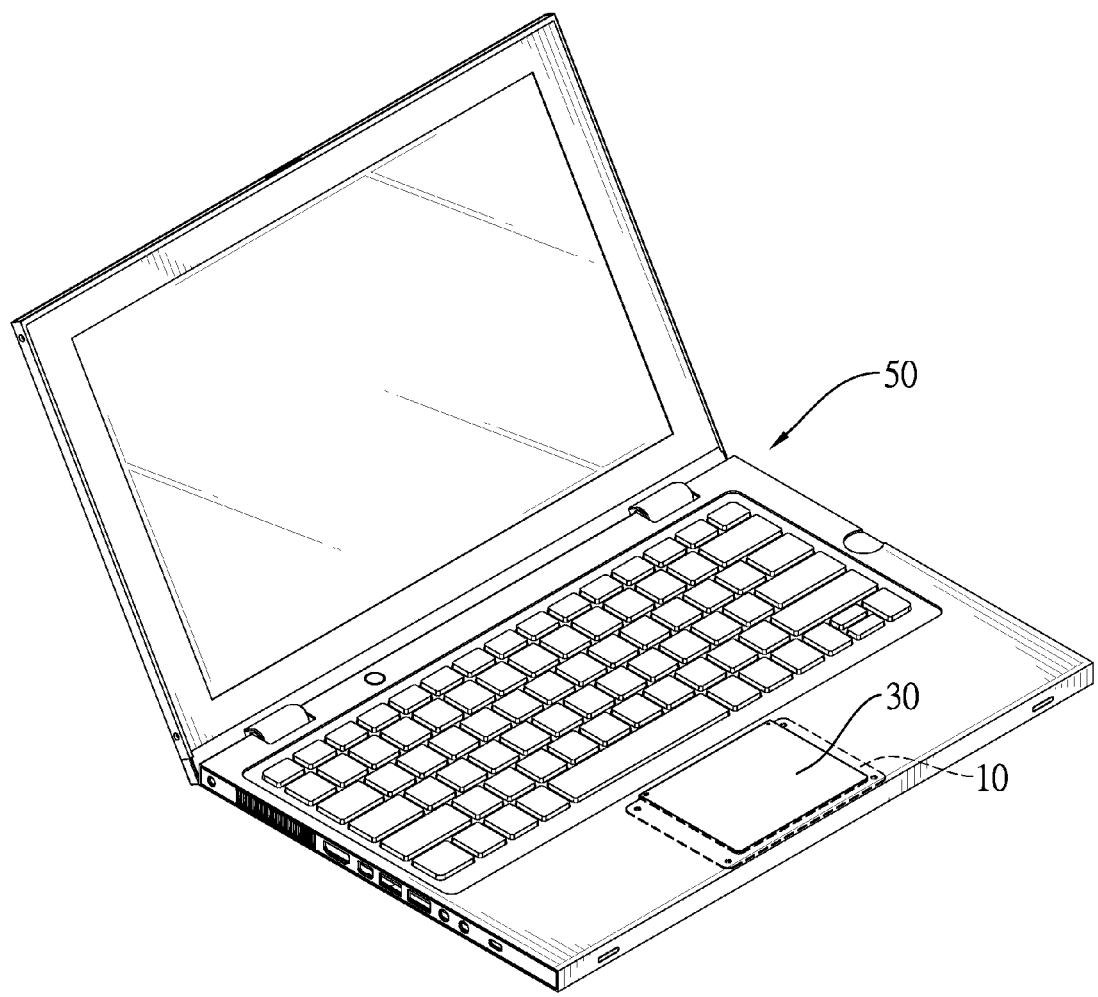
FIG. 6 is a perspective view of the input device in FIG. 1, showing the input device mounted in a portable electronic device.

With reference to FIG. 6, when the input device as described is assembled, the base 10 is mounted in a casing of a portable electronic device 50. The touchpad 30 is exposed outside of the casing of the portable electronic device 50, such that a user can operate the touchpad 30.

Figure 8:
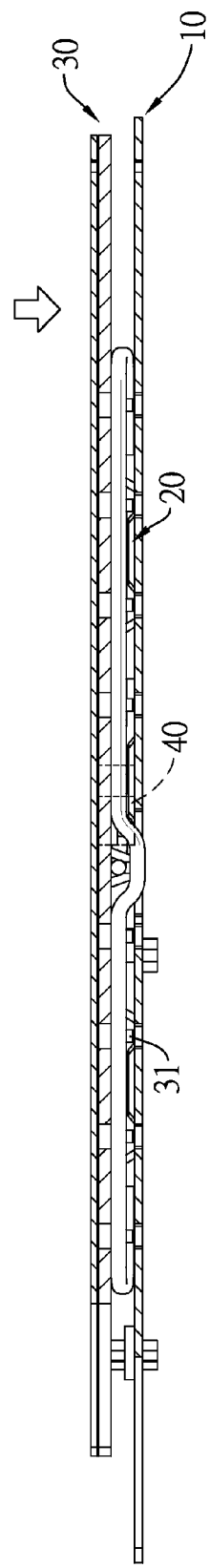
FIG. 8 is a side view in partial section of the input device in FIG. 1, showing the touchpad pressed.

With reference to FIGS. 2 and 7, normally, the switch 40, which is mounted on the bottom of the touchpad 30, abuts the top of the base 10, such that the touchpad 30 is supported at a height. With reference to FIGS. 2, 3 and 8, when the touchpad 30 is pressed down, the shafts 20 rotate relative to the touchpad 30 and the base 10 simultaneously. When the shafts 20 rotate, the shafts 20 pull down the touchpad 30 by the pivot segments 31 mounted on the bottom of the touchpad 30. As the shafts 20 intersect each other, the shafts 20 can together pull down the touchpad 30 in a manner of "surface". The intersection of the shafts 20 is adjacent to a center of the touchpad 30 and the switch 40, such that the shafts 20 can pull down the touchpad 30 from a place near the center of the touchpad 30. Pulling down from the center of the touchpad 30 can avoid leverage caused by the switch 40, thereby preventing the touchpad 30 from deformation and avoiding affecting the user's feel of pressing. Because each shaft 20 protrudes into the diagonal opposite corners of the touchpad 30, the touchpad 30, from the center to the corners of the touchpad 30, receives a pulling-down force uniformly applied. Consequently, no matter on what location the touchpad 30 is pressed, a pressing force is spread uniformly, which makes the touchpad 30 receive the pressing force equally and move down evenly without tilting. To sum up, the input device can make the touchpad 30 move down evenly, and prevent the touchpad 30 from deformation.

Figure 11:
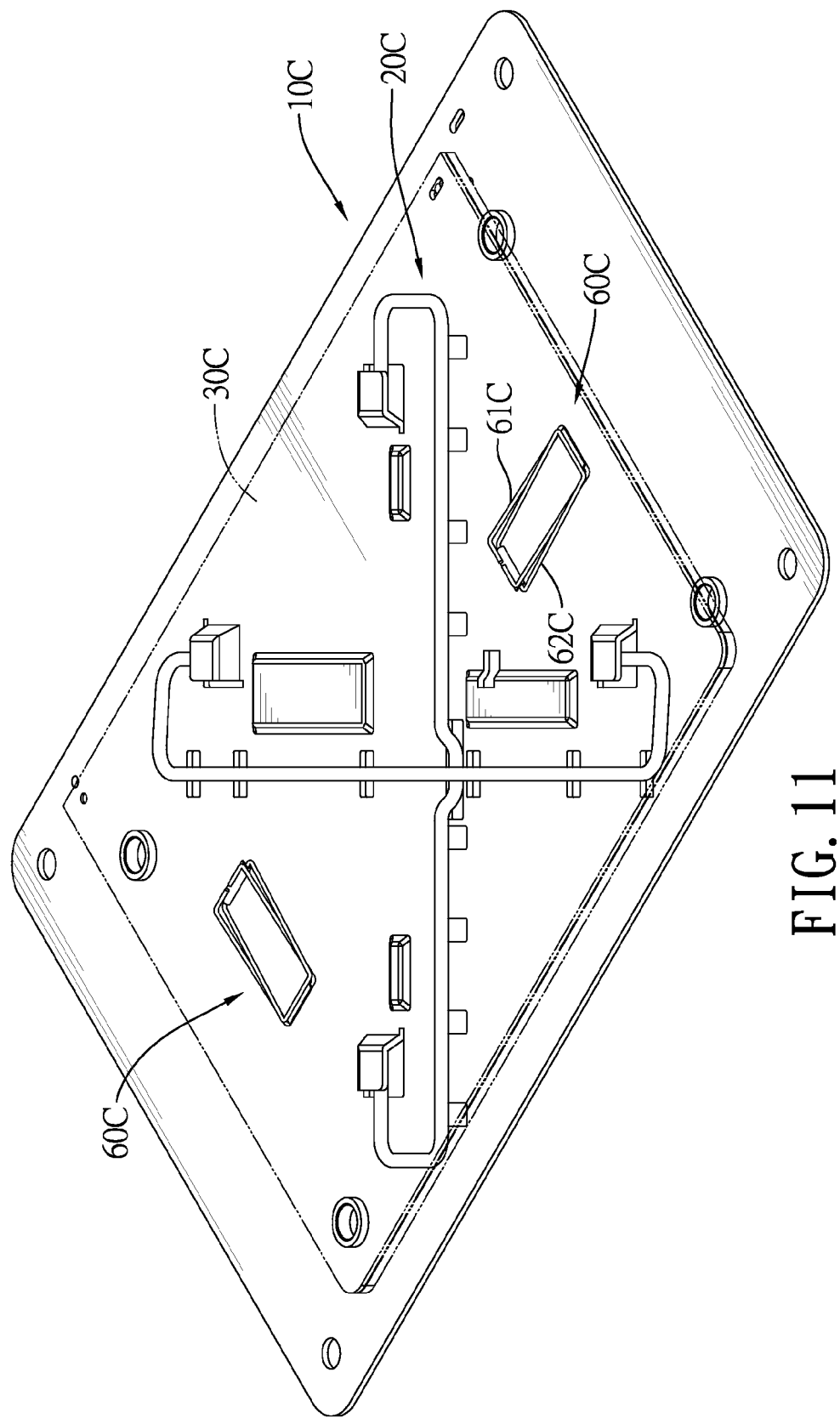
FIG. 11 is a perspective view of a second embodiment of the input device in accordance with the present invention, showing scissor mechanisms.
Figure 12:
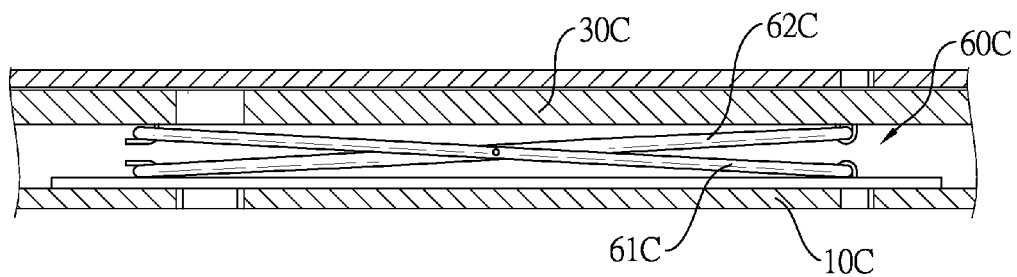
FIG. 12 is an enlarged side view in partial section of the input device in FIG. 11.

With reference to FIGS. 11 and 12, a second embodiment of the present invention further comprises two scissor mechanisms 60C mounted between the base 10C and the touchpad 30C. Each scissor mechanism 60C is disposed in a region surrounded by the intersecting shafts 20C and one of the sides of the touchpad 30C to assist the up-and-down moving of the touchpad 30C. In a preferred embodiment, the scissor mechanisms 60C are each respectively disposed on two opposite sides of the intersection of the shafts 20C. Each scissor mechanism 60C has two frames 61C, 62C pivotally connected to each other. One of the frames 61C is pivotally connected to the base 10C and is slidably connected to the bottom of the touchpad 30C. The other one of the frames 62C is slidably connected to the base 10C and is pivotally connected to the bottom of the touchpad 30C. The scissor mechanism 60C is mounted securely on the bottom of the touchpad 30C to prevent the touchpad 30C from horizontally moving relative to the base 10C. The scissor mechanisms 60C are disposed in directions perpendicular to each other, thereby strengthening the horizontal connection of the base 10C and the touchpad 30C in different directions. Besides, the scissor mechanisms 60C also can make the touchpad 30C move down evenly and stably relative to the base 10C.

Figure 13:
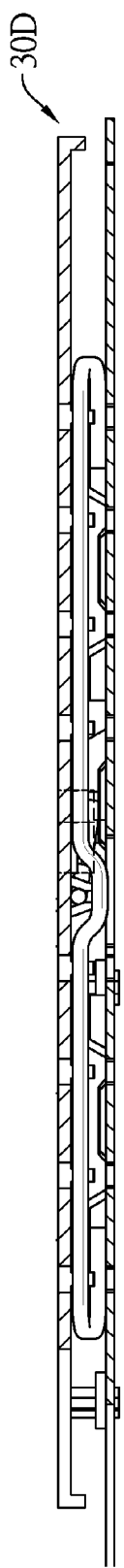
FIG. 13 is a side view in partial section of a third embodiment of the input device in accordance with the present invention.
Figure 14:
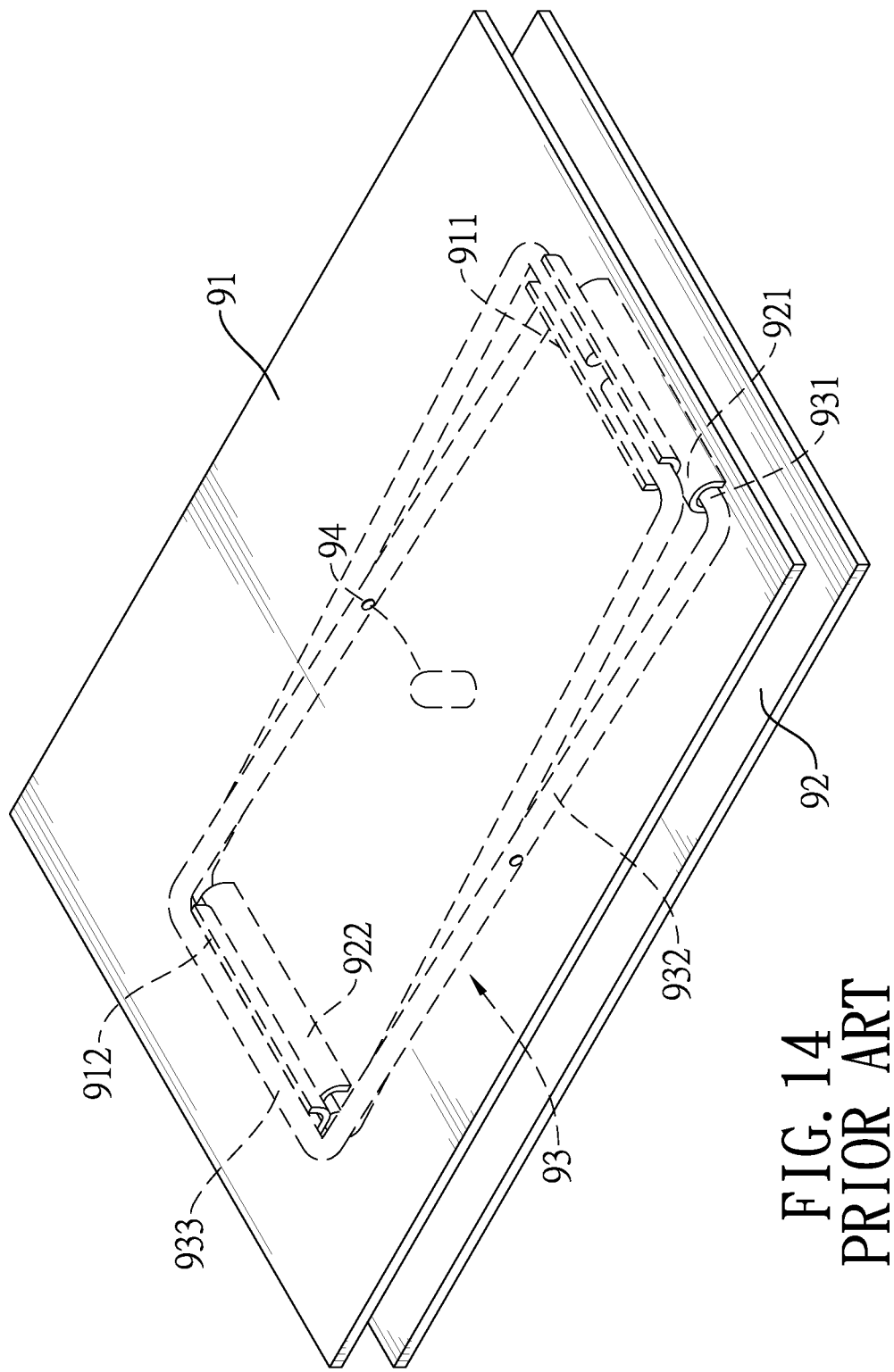
FIG. 14 is a perspective view of a conventional touchpad in accordance with the prior art.
Figure 15:
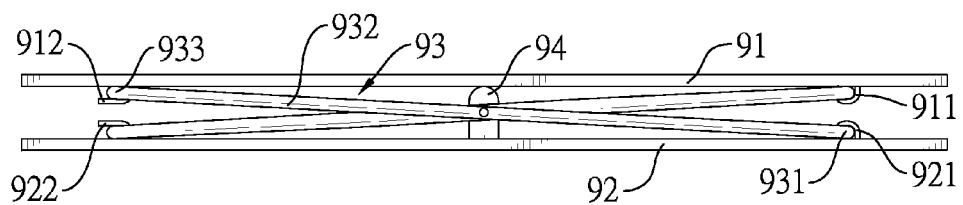
FIG. 15 is a side view in partial section of the conventional touchpad in FIG. 14, showing the touchpad unpressed.
Figure 16:
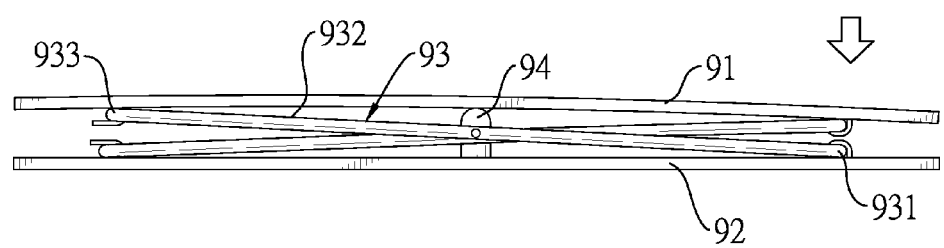
FIG. 16 is a side view in partial section of the conventional touchpad in FIG. 14, showing the touchpad pressed.

With reference to FIG. 13, a third embodiment of the present invention is similar to the second embodiment as mentioned above. However, the third embodiment is applied in keys of the keyboard, and the touchpad is replaced by a key cap 30D.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An input device comprising:
    a base having multiple limits mounted on a top of the base;
    two shafts intersecting each other, and each shaft having
        two ends each respectively mounted in the corresponding limits of the base;
    a touchpad mounted on the shafts; and
    a switch mounted between the base and the touchpad;
    wherein the ends of each shaft each respectively protrude to two diagonally opposite corners of the touchpad, and each shaft is nonparallel to a corresponding side of the touchpad;
    wherein one of the shafts has a bending segment bent in the rod part, and the bending segment is curved to allow the other shaft to pass through the bending segment such that the shafts intersect each other;
    wherein the base has a bending recess formed in the top of the base to receive the bending segment of the shaft;
    wherein the touchpad has multiple pivot segments formed on a bottom of the touchpad and each shaft is rotatably mounted in the corresponding pivot segments of the touchpad; and
    wherein the base has multiple pivot recesses formed in the top of the base to respectively receive the pivot segments of the touchpad.

2. The input device as claimed in claim 1, wherein the switch is a resilient switch, and the resilient switch abuts the base and the touchpad to allow the touchpad to move up and down relative to the base.

3. The input device as claimed in claim 1, further comprising at least one resilient element mounted between the base and the touchpad, and abutting the base and the touchpad to allow the touchpad to move up and down relative to the base.

4. The input device as claimed in claim 1, wherein each shaft has
    a rod part; and
    two connecting ends each respectively bent from two ends of the rod part, and each respectively and slidably mounted in the limits of the base to allow the rod part to abut a bottom of the touchpad in parallel.

5. The input device as claimed in claim 4, wherein each connecting end of each shaft has
    a connecting segment bent from the rod part; and
    an inserting segment bent from the connecting segment, and slidably mounted in the corresponding limit of the base.

6. The input device as claimed in claim 1, wherein
    the base has multiple positioning holes formed in the top of the base; and
    the touchpad has multiple positioning pins formed on a bottom of the touchpad, and each positioning pin respectively mounted in the positioning holes of the base.

7. The input device as claimed in claim 1, wherein the touchpad has multiple limit recesses formed in a bottom of the touchpad to respectively receive the limits of the base.

8. The input device as claimed in claim 1 further comprising multiple scissor mechanisms mounted between the base and the touchpad, wherein each scissor mechanism is disposed in a region surrounded by the intersecting shafts and a side of the touchpad.

9. The input device as claimed in claim 8, wherein each scissor mechanism has two frames pivotally connected to each other; one of the frames is pivotally connected to the base and slidably connected to the touchpad; the other of the frames is slidably connected to the base and pivotally connected to the touchpad.

10. The input device as claimed in claim 1, wherein
    each limit of the base has
        a top part;
        two side parts, each side part connected to the top part and the base;
        an inner space surrounded by the top of the base, the two side parts and the top part; and
        an opening surrounded by the top of the base, the two side parts and the top part, and the opening communicating with the inner space; and
    the ends of each shaft are each respectively mounted through the opening of the corresponding limit, and are each respectively and slidably mounted into the inner space of the corresponding limit.

11. The input device as claimed in claim 1, wherein a position of the switch corresponds to a center of the touchpad, and is adjacent to an intersection of the shafts.

12. The input device as claimed in claim 1, wherein the switch is mounted on the top of the base or a bottom of the touchpad.

13. A lifting structure for an input device, the lifting structure comprising:
- a mounting surface having multiple limits mounted on the mounting surface;
- two shafts intersecting each other, and each shaft having a rod part and two connecting ends each respectively bent from two ends of the rod part, wherein each connecting end is respectively mounted in the corresponding limits of the mounting surface;
- a supporting surface defined by the rod parts of the shafts; and
- a top cover mounted on the supporting surface;
- wherein the connecting ends of each shaft each respectively protrude to two diagonally opposite corners of the top cover, and each shaft is nonparallel to a corresponding side of the top cover;
- wherein one of the shafts has a bending segment bent in the rod part, and the bending segment is curved to allow the other shaft to pass through the bending segment such that the shafts intersect each other;
- wherein the mounting surface has a bending recess formed in the top of the mounting surface to receive the bending segment of the shaft;
- wherein the top cover has multiple pivot segments formed on a bottom of the top cover and each shaft is rotatably mounted in the corresponding pivot segments of the top cover; and
- wherein the mounting surface has multiple pivot recesses formed in the top of the mounting surface to respectively receive the pivot segments of the top cover.

14. The lifting structure for an input device as claimed in claim 13, wherein the shafts intersect in a cross shape or an X shape.

15. The lifting structure for an input device as claimed in claim 13, wherein each connecting end of each shaft has
- a connecting segment bent from the rod part; and
- an inserting segment bent from the connecting segment, and slidably mounted in the corresponding limit of the mounting surface.

16. The lifting structure for an input device as claimed in claim 13, wherein
- each limit of the mounting surface has
    - a top part;
    - two side parts, each side part connected to the top part and the mounting surface;
    - an inner space surrounded by the mounting surface, the two side parts and the top part; and
    - an opening surrounded by the mounting surface, the two side parts and the top part, and the opening communicating with the inner space; and
- the ends of each shaft are each respectively mounted through the opening of the corresponding limit, and are each respectively and slidably mounted into the inner space of the corresponding limit.

17. The lifting structure for an input device as claimed in claim 13 further comprising at least one resilient element mounted between the mounting surface and the top cover, and abutting the mounting surface and the top cover to allow the top cover to move up and down relative to the mounting surface.

18. The lifting structure for an input device as claimed in claim 13, wherein the top cover is a touchpad or a key cap.

* * * * *